United States Patent
Lessner et al.

(10) Patent No.: US 6,334,945 B1
(45) Date of Patent: Jan. 1, 2002

(54) AGING PROCESS FOR SOLID ELECTRODE CAPACITOR

(75) Inventors: Philip Michael Lessner; Randolph Stephen Hahn, both of Simpsonville; Brian John Melody, Greer; Erik Karlsen Reed, Mauldin; John Tony Kinard, Greer, all of SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 0 days.

(21) Appl. No.: 09/656,826

(22) Filed: Sep. 7, 2000

(51) Int. Cl.$^7$ ............................................. C25D 11/08
(52) U.S. Cl. ................... 205/687; 205/688; 205/704; 205/229; 361/508; 361/509; 361/528; 361/529
(58) Field of Search ................. 205/687, 688, 205/704, 229; 361/508, 509, 528, 529

(56) References Cited

U.S. PATENT DOCUMENTS

| | | |
|---|---|---|
| 4,785,380 A | 11/1988 | Harakawa et al. |
| 5,428,500 A | 6/1995 | Nishiyama et al. |
| 5,436,796 A | 7/1995 | Abe et al. |
| 5,455,736 A | 10/1995 | Nishiyama et al. |
| 5,461,537 A | 10/1995 | Kobayashi et al. |
| 5,473,503 A | 12/1995 | Sakata et al. |
| 5,567,209 A | 10/1996 | Kobayashi et al. |
| 5,567,356 A | 10/1996 | Kinlen |
| 5,586,000 A | 12/1996 | Sakata et al. |
| 5,586,001 A | 12/1996 | Amano et al. |
| 5,621,608 A | 4/1997 | Arai et al. |
| 6,001,281 A | 12/1999 | Lessner et al. |
| 6,136,176 A | 10/2000 | Wheeler et al. |

OTHER PUBLICATIONS

Monsanto, XICP–0S01 Experimental Product Data Sheet, dated Jul. 1996.
Thomas S. Gore, Jr., Capacitors, Discrete Circuit Components, date unknown.

*Primary Examiner*—Arun S. Phasge
(74) *Attorney, Agent, or Firm*—Banner & Witcoff, Ltd.

(57) ABSTRACT

A process for isolating flaw sites in the dielectric of solid electrolytic capacitor comprising immersing a conductive polymer impregnated capacitor in an electrolyte solution, and then alternately subjecting the conductive polymer impregnated capacitor to a high voltage and a low voltage; wherein the high voltage is between about 10 volts and 50 volts, and the low voltage is between about 0 volts and the voltage corresponding to 90% of the anodization voltage for pellets anodized at less than 20 volts, or the voltage at which the current drops to 50% of the peak voltage current for pellets anodized at voltages greater than or equal to 20 volts. The period of time at or above the anodization voltage is relatively short to prevent damaging the dielectric film.

15 Claims, 5 Drawing Sheets

AGING PROCESS FOR SOLID ELECTRODE CAPACITOR

FIELD OF THE INVENTION

The present invention is directed to an aging process for solid electrolytes.

BACKGROUND OF THE INVENTION

An anode of a solid state tantalum electrolytic capacitor is typically made from a porous pellet of sintered tantalum. A dielectric layer, such as a tantalum pentoxide dielectric layer, is formed by anodizing the pellet in an appropriate electrolyte. Typically, cathode material for solid tantalum electrolytic capacitors is manganese dioxide. Recently capacitors employing conductive polymers as the counter electrode have become commercially available.

One of the advantages of the conductive polymer device is lower equivalent series resistance (ESR). Such low ESR is required in several capacitor applications including voltage regulation for microprocessors. As microprocessors have become more complex and operating frequencies have increased, these applications have called for higher currents, and higher capacitance, while operating voltages have decreased in order to prevent overheating of the microprocessor. As current requirements increase, further reductions in the ESR of the capacitors is necessary in order to properly regulate the operating voltage. The trend toward higher currents and lower operating voltages which require low ESR capacitors is ongoing.

Another well established trend in the electronics industry, particularly in the field of computers and telecommunications, is toward miniaturization of electronic devices. Volumetric efficiency, defined as the product of the capacitance times the rated voltage of the device per unit volume, is a critical parameter for capacitors in the electronics industry, especially where board space is limited. Due to high volumetric efficiency, tantalum capacitors are components of choice in such industries. The high volumetric efficiency of tantalum capacitors is due to the large surface area of the porous tantalum anode.

Capacitance is proportional to the surface area and inversely proportional to the anodization voltage. In order to maintain high volumetric efficiency and device reliability, the anodization voltage must be selected based on the voltage rating of the capacitor. If the anodization voltage is too low the device may fail when used in applications involving higher operating voltages than the low voltage dielectric can withstand. If the anodization voltage is too high, capacitance and volumetric efficiency decrease. Typically the anodization voltage is from 2.5 to 4 times the rated voltage of the capacitor.

Cathode material is selected for solid tantalum capacitors based on its ability to isolate flaws in the dielectric. For instance, after coating the surfaces of the dielectric (e.g. a tantalum pentoxide dielectric) with the cathode material (either manganese dioxide or conductive polymer), defect sites in the dielectric are then isolated by reanodizing. Voltage is applied causing current to flow through the flaw sites in the dielectric film. As the current flows through the flaw site, the counter electrode material immediately adjacent to the flaw site is rendered nonconductive. For manganese dioxide, it is believed the mechanism is due to Joule heating at the flaw site, causing the temperature of the manganese dioxide immediately adjacent to the flaw site to increase due to conduction. As the temperature of the manganese dioxide immediately adjacent to the flaw site reaches the decomposition temperature of manganese dioxide (500–600° C.), it is converted to manganese sesquioxide, thus isolating the flaw site. Leakage currents through the flaw sites decrease according to Ohm's Law as the resistance of the cathode material surrounding the flaw site increases. A similar mechanism is postulated for conductive polymer counter electrodes. Other possible mechanisms to account for the healing mechanism of conductive polymer films include complete decomposition of the polymer adjacent to the flaw site, over oxidation of the polymer, and redoping of the polymer at the flaw site.

Figure 1:
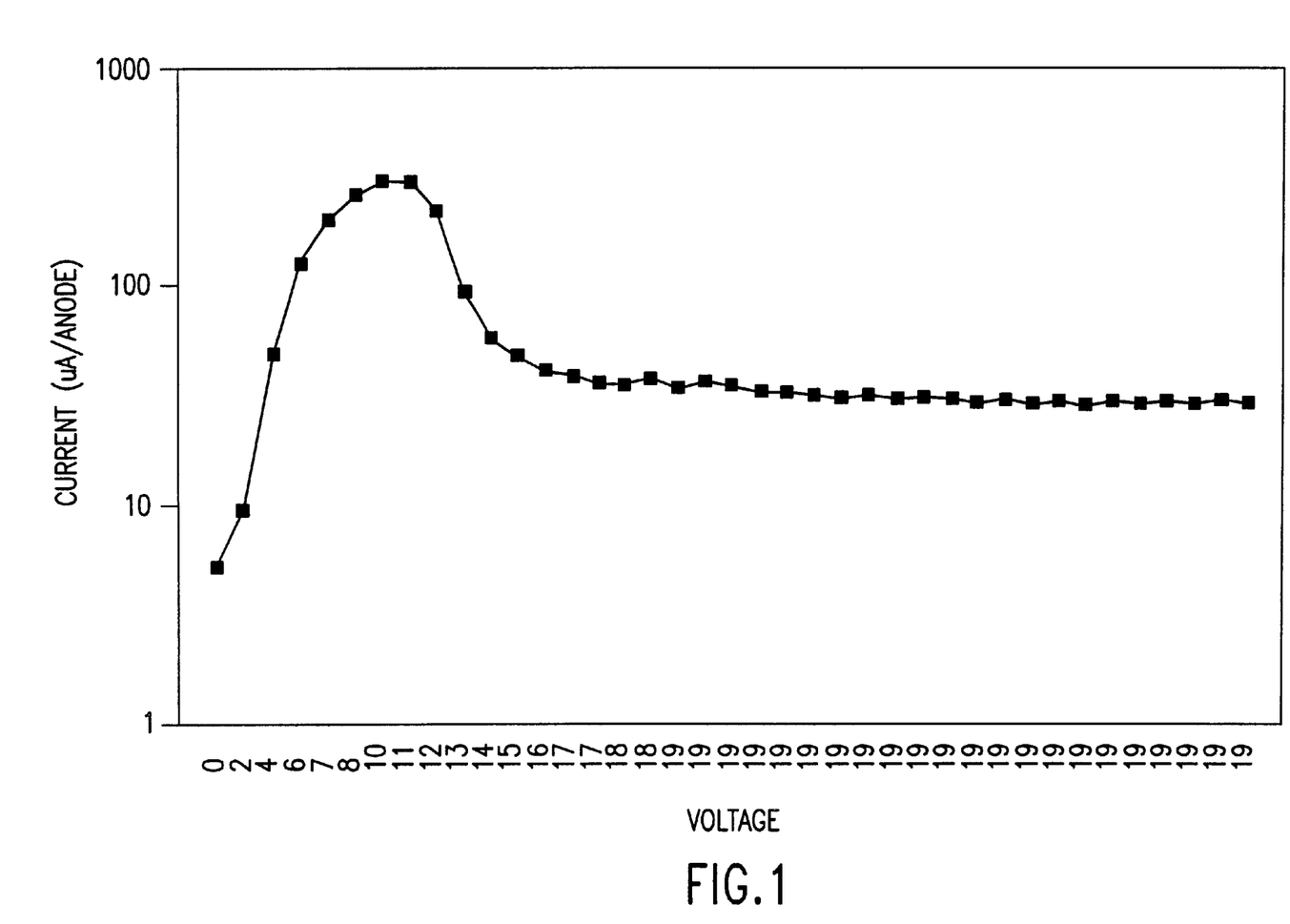
FIG. 1 depicts a typical reanodization profile.
Figure 2:
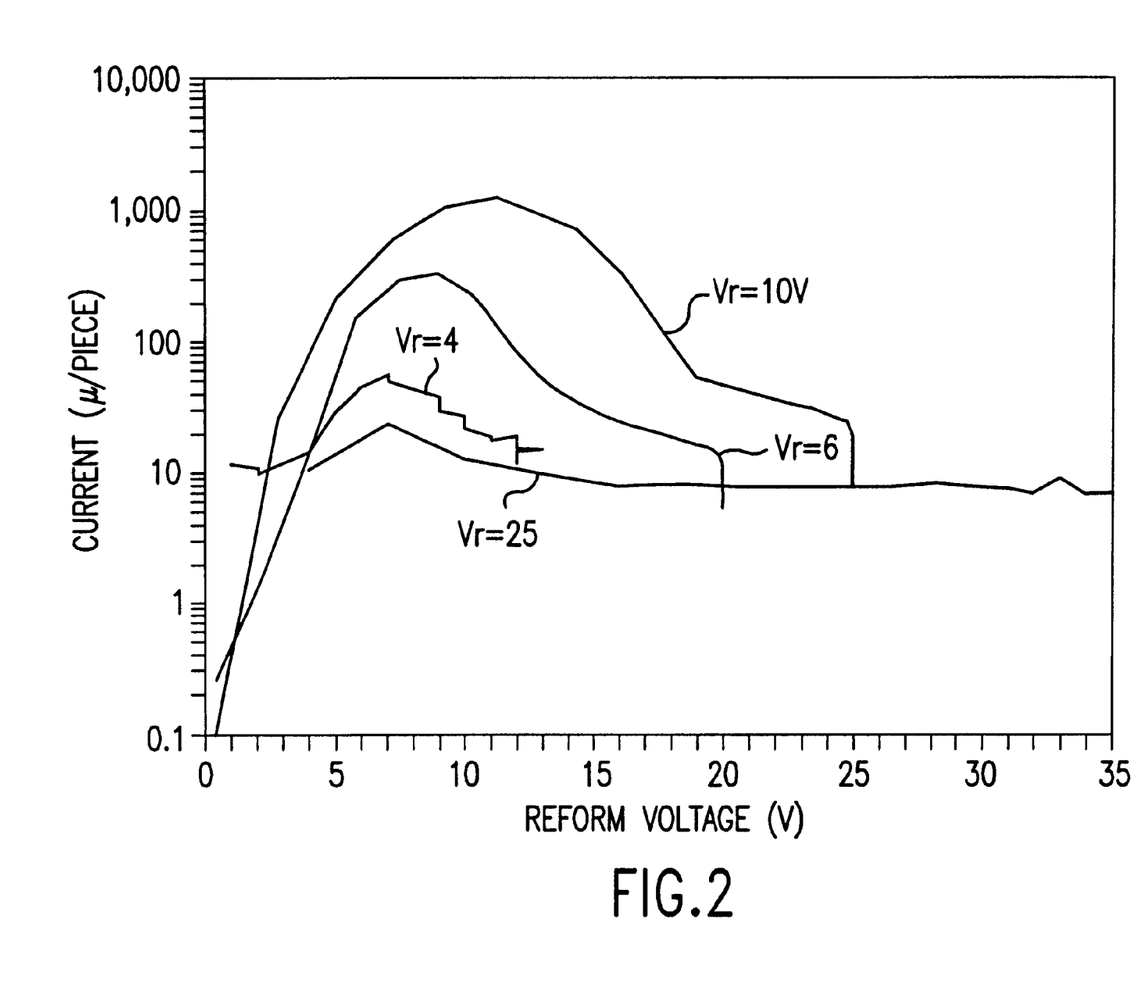
FIG. 2 depicts reanodization of different voltage ratings.

The so called 'healing' phenomenon can be demonstrated by plotting the current versus the applied voltage during the reanodization process. A typical reanodization process profile for a tantalum capacitor manufactured with a conductive polymer counter electrode is illustrated in FIG. 1. The tantalum oxide dielectric film was formed to 20 V at 60 ° C. Voltage and current increase during the initial stages of the reanodization process following Ohm's Law. At approximately 9–11 volts the current peaks, and decreases rapidly while the voltage continues to increase to the set point voltage for the process (19 volts in this case). Beyond the voltage at which the current peaks, no obvious relationship between the applied voltage and current flow is observed due to the increasing resistance of the conductive polymer immediately adjacent to the dielectric flaw sites. The reanodization voltage must exceed the voltage corresponding to the peak current to generate sufficient heat to properly isolate the dielectric flaws. In related application U.S. Ser. No. 09/315,960 filed May 21, 1999, now U.S. Pat. No. 6,136,176, it was anticipated that the reanodization voltage would need to be 60 to 85% of the formation voltage for 6 and 10 volt rated parts (anodization voltages of 18 to 35 V). More recently, it has been found that for 4 volt rated parts (anodization voltages of 11 to 13 volts), the reanodization voltage needs to be 90 to 98% of the anodization voltage. The voltage at which the peak current flows is nearly independent of the anodization voltage (FIG. 2).

This presents a problem for manufacturing tantalum capacitors in the 2–3 volt rating range. The anodization voltage for these devices is 8 to 10 volts. The 9 to 11 volts, needed to cause healing of the flaw sites, exceeds the anodization voltage and this can lead to dielectric degradation.

It was discovered that the reanodization voltage can be raised above the formation voltage for brief periods of time and this causes healing of the flaw sites without damage to the dielectric film.

SUMMARY OF THE INVENTION

The invention is directed to a process for aging solid electrolytic capacitors using a pulse voltage technique to accelerate the healing mechanism and allow voltages in excess of the anodization voltage to be employed.

It is an object of this invention to reduce the leakage current of solid electrolytic capacitors impregnated with conductive polymer electrodes.

It is another object of the present invention to isolate flaw sites in the dielectric film of solid electrolytic capacitors impregnated with conductive polymer counter electrodes without damaging the dielectric film.

It is a further object of this invention to minimize decomposition of the conductive polymer counter electrode during the reanodization process.

It is yet another object of this invention to accelerate the reanodization process for isolating the flaw sites of solid electrolytic capacitors impregnated with conductive polymer electrodes.

It is another object of the invention to apply the aging process to capacitors with low voltage ratings, e.g. 2–4 volt, as well as higher voltage devices.

The invention is directed to a process for isolating flaw sites in the dielectric of solid electrolytic capacitor comprising alternately subjecting a conductive polymer impregnated capacitor to a high voltage and a low voltage; wherein the high voltage is between about 10 volts and 50 volts, and the low voltage is between about 0 volts and the voltage corresponding to 90% of the anodization voltage for pellets anodized at less than 20 volts, or the voltage at which the current drops to 50% of the peak voltage current for pellets anodized at voltages greater than or equal to 20 volts.

DETAILED DESCRIPTION OF THE INVENTION

Flaw sites may be isolated in the dielectric of solid electrolytic capacitor by alternately subjecting a capacitor to voltages about equal to or above the anodization voltage followed by voltages less than the anodization voltage.

A capacitor is typically prepared from a porous pellet. The porous pellet is prepared, for example, by pressing a powder and sintering to form a porous body. The pellets may be made from any suitable material such as tantalum, aluminum, niobium, hafnium, zirconium, titanium, or compounds and alloys of these elements. Tantalum is the preferred material.

The sintered pellet is then anodized to form the oxide film which serves as the dielectric of the capacitor. A suitable anodizing method includes, but is not limited to immersing the pellets in a phosphoric acid and water electrolyte and applying the appropriate anodizing voltage, typically about 1.5 to about 8 times the rated voltage of the finished device, more typically about 2.5 to about 6 times the rated voltage of the finished device.

The surfaces of the anodic oxide film are next coated with a conductive polymer material using either an electrochemical or chemical oxidative process. For example, the pellets are impregnated with a poly(3,4-ethylenedioxythiophene) using a chemical oxidation process. In the case of a chemical oxidative process, by-products of the reaction are removed by washing prior to the reanodization process used to isolate the defect sites in the dielectric. Pellets can be similarly coated with polypyrrole, polyaniline, polythiophene, or their derivatives by either a chemical oxidative process or an electrochemical process. Pellets may also be coated by dipping in dispersions containing polythiophene, polypyrrole, polyaniline, or their derivatives.

The pellets are then placed in suitable electrolyte bath, for instance a dilute aqueous phosphoric acid solution with a conductivity in the range 50 to 4000 $\mu$S/cm. Other suitable electrolyte baths are solutions containing an acid or salt not corrosive to valve metal or valve metal oxides, particularly tantalum or tantalum oxide. Suitable baths include, but are not limited to, nitric acid, sulfonic acids and their salts (para-toluene sulfonic acid), carboxylic acids and their salts, and salts of phosphoric acid (monobasic potassium phosphate, ammonium phosphate, sodium phosphate). The electrolyte may contain an organic solvent such as polyethylene glycol, ethylene glycol, alcohols, and the like.

The temperature of the electrolytic bath is generally from about 0 to about 100° C., preferably from about 20 to about 85° C.

Voltage is applied in cycles such that the maximum voltage is sufficient to drive the process which causes isolation of the dielectric flaw sites, generally about 10 volts to about 50 volts, preferably about 15 to about 30 volts. This allows treatment of devices with ratings of 2–4 volt as well as higher rated devices.

The minimum voltage in the cycle is below the voltage which causes harm to the dielectric or harm to the polymer at sites removed from the immediate vicinity of the dielectric flaw sites, generally 0 to 90% of the anodization voltage, preferably 0 to 50% of the anodization voltage for pellets anodized at less than 20 volts. For pellets anodized at voltages greater than or equal to 20 volts the minimum voltage is generally between 0 volts and the voltage at which the current drops to 50% of the peak voltage current. The difference between the peak voltage and minimum voltage should be sufficient to cause the current flow at the peak voltage to be at least 2 times the current flow at the minimum voltage, preferably the voltage difference should be sufficient to cause the current flow at the peak voltage to be at least 10 times the current flow at the minimum voltage.

Any suitable voltage wave form to provide the desired result may be used such as, but not limited to, sine wave, square wave, triangular wave, rectangular wave, or parabolic wave. The period of the voltage wave must be sufficient to allow the flaw sites to be isolated, yet not so long to allow damage to the dielectric to occur.

The period is generally 0.01 to 10 seconds, preferably about 0.5 to about 1.5 seconds, more preferably about 1 second. The period of time above or near the anodization voltage is relatively short to prevent damaging the dielectric film.

The duration of the cycles is about 1 minute to about 60 minutes, preferably about 5 to about 20 minutes.

After the reform process, the pellets are washed to remove any electrolyte residues. The reformed pellets are subsequently treated as desired. For example, the pellets may be coated with a carbon layer and then dipped in a silver paint.

The aging process of the invention has application for capacitors with low voltage ratings (2–4 volts), as well as higher voltage devices. Advantages include reduced process time and reduced polymer degradation at sites not immediately adjacent to the dielectric flaw site.

EXAMPLES

Preparation of Sintered Pellets

Pellets of dimensions 0.182×0.128×0.032 inches were pressed from commercially available capacitor grade tantalum powder. The pellets were sintered to create tantalum anodes with 48,000 CV/g. These pellets were used in the following examples.

Example 1

A group of sintered pellets were anodized in a phosphoric acid and water electrolyte to 9 volts at 60° C. The pellets were impregnated with a poly(3,4-ethylenedioxythiophene) using a chemical oxidation process. One group of impregnated pellets were submerged in an aqueous phosphoric acid electrolyte. Voltage to the system was alternated between approximately 0 and 15 volts at 24° C. with approximately 1 cycle per second. Alternating voltage was applied for 5 minutes, after which the capacitors were allowed to discharge. Voltage was subsequently ramped rapidly to 9.5 volts to allow the reanodization end current to be recorded. Following the reform process, the pellets were washed to remove the electrolyte residues. Following the application of a carbon layer the pellets were dipped in a silver paint, and the capacitance, dissipation factor, ESR, and leakage current were recorded.

Comparative Example 1

A second group of impregnated pellets were placed in the same reanodization bath as utilized in Example 1 and the voltage was ramped to 9.5 volts in 9 minutes. The pellets were held at 9.5 volts for 11 minutes and the reanodization end current was recorded. Following the reform process, the pellets were washed to remove the electrolyte residues. Following the application of a carbon layer, the pellets were dipped in a silver paint, and the capacitance, dissipation factor, ESR, and leakage current were recorded.

| Example | Reanodization End Current (UA/anode) | 120 Hz Cap (uF) | 120 Hz DF | 100K Hz ESR (milliohms) | Median Leakage (uA) |
|---|---|---|---|---|---|
| 1 | 9 | 316.8 | 3.85 | 36.7 | 1.33 |
| Comp. 1 | 189 | 317.5 | 4.28 | 39.1 | 121 |

Example 2

Figure 3:
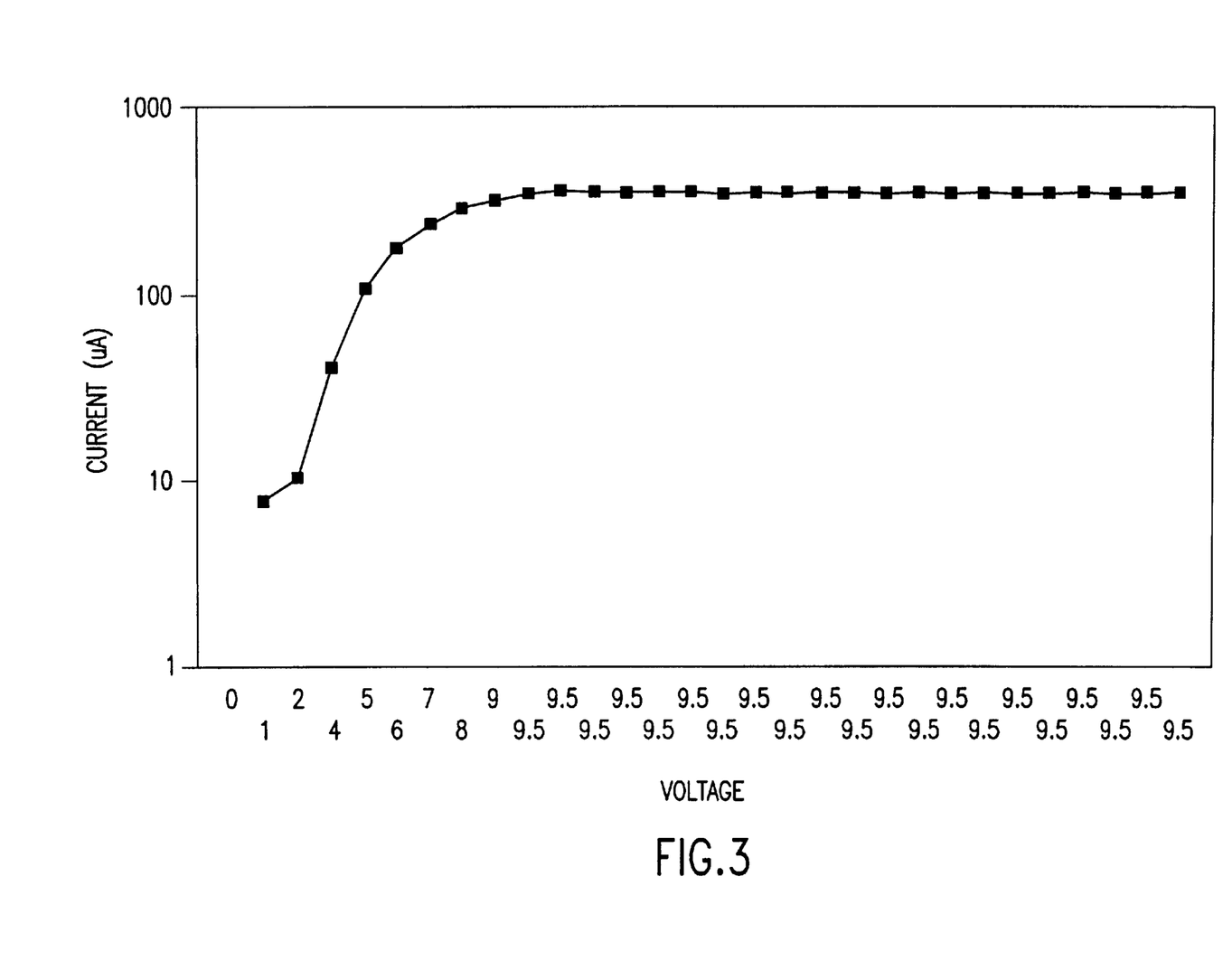
FIG. 3 depicts reanodization profile of partially impregnated anodes.

Another group of sintered pellets was anodized to 10 volts in a phosphoric acid and water electrolyte, and then impregnated with a conductive polymer (poly(3,4-ethylenedioxythiophene)) using a chemical oxidation process. The partially impregnated pellets were reanodized using a standard reanodization process developed for higher anodization voltages. The reanodization voltage was reduced to 9.5 volts to prevent exceeding the effective anodization voltage. Currents during the reanodization voltage peaked but did not turn over as required to effectively isolate the flaw sites in the dielectric. The reanodization profile is depicted in FIG. 3.

Figure 4:
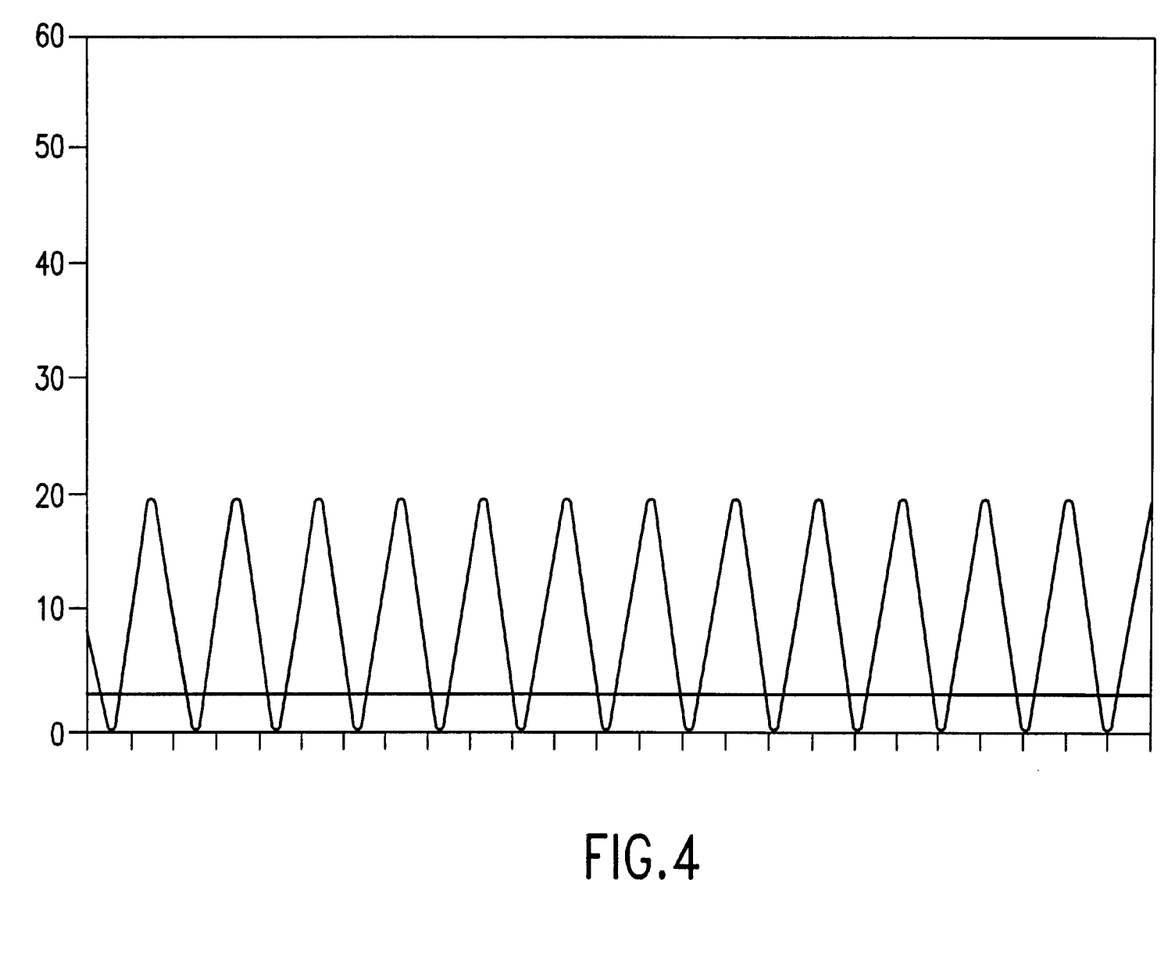
FIG. 4 depicts a voltage waveform.

The impregnation process was continued to fully impregnate the pellets with conductive polymer using a chemical oxidation process. The lot was split and one group was reanodized using a wave form generator to apply a triangular voltage wave form to the anodes with the voltage varied between 0 and 20 volts with at 1 cycle per second (FIG. 4). The duration of the process was 5 minutes. Following the reanodization process, the pellets were washed to remove the electrolyte residues. Following the application of a carbon layer the pellets were dipped in a silver paint, and the capacitance, dissipation factor, ESR, and leakage current were recorded.

Comparative Example 2

Another group of impregnated anodes from Example 2 was reanodized in the electrolyte bath utilized in Example 2 using a the standard reanodization profile utilized for the partially impregnated pellets. Following the reform process, the pellets were washed to remove the electrolyte residues. Following the application of a carbon layer the pellets were dipped in a silver paint, and the capacitance, dissipation factor, ESR, and leakage current were recorded.

Comparative Example 3

Figure 5:
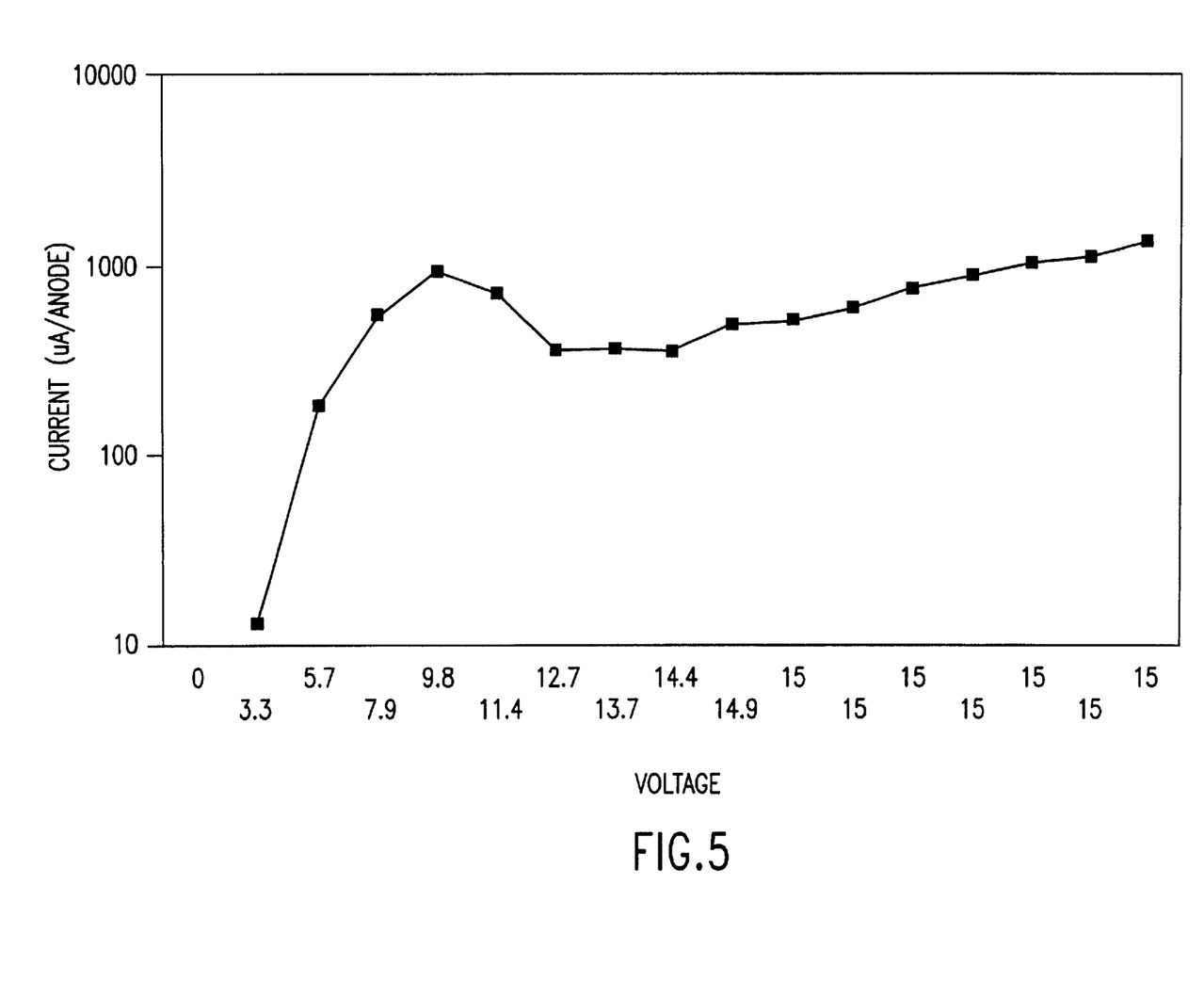
FIG. 5 depicts increasing current during reanodization.

A third group of impregnated anodes of Example 2 was reanodized in the electrolyte bath utilized in Example 2 using a standard reanodization ramp rate utilized for the partially impregnated pellets but the peak voltage was increased to 15 volts. The voltage versus current profile depicted in FIG. 5 shows that reanodization currents increased during the 15 volt hold period of the process. Following the reform process, the pellets were washed to remove the electrolyte residues. Following the application of a carbon layer the pellets were dipped in a silver paint, and the capacitance, dissipation factor, ESR, and leakage current were recorded.

| Example | 120 Hz Cap (uF) | 120 Hz DF | 100K Hz ESR (milliohms) | Median Leakage (uA) |
|---|---|---|---|---|
| 2 | 306 | 4.48 | 38.3 | 15.7 |
| Comp. 2 | 301 | 4.6 | 40.6 | 171.7 |
| Comp. 3 | 276 | 7.7 | 58.6 | >999 |

The leakage current of capacitors subjected to pulsing the reanodization voltage to 15 volts is one to two orders of magnitude less than that of capacitors that have been subjected to the standard reanodization voltage of 9.5 volts. Holding the capacitors at 15 volts for an extended period of time irreversibly damages the dielectric and leads to very high leakage currents.

What is claimed is:

1. A process for isolating flaw sites in the dielectric of solid electrolytic capacitor comprising immersing a conductive polymer impregnated capacitor in an electrolyte solution, and then alternately subjecting the conductive polymer impregnated capacitor to a high voltage and a low voltage; wherein the high voltage is between about 10 volts and 50 volts, and the low voltage is between about 0 volts and the voltage corresponding to 90% of the anodization voltage for pellets anodized at less than 20 volts, or the voltage at which the current drops to 50% of the peak voltage current for pellets anodized at voltages greater than or equal to 20 volts.

2. The process according to claim 1 wherein the electrolyte solution has a conductivity in the range 50 to 4000 $\mu$S/cm.

3. The process according to claim 1 wherein the electrolyte solution is an aqueous solution comprising an acid or salt which is noncorrosive to valve metals or valve metal oxides.

4. The process of claim 3 wherein the electrolyte solution is an aqueous solution comprising an acid or salt which is noncorrosive to tantalum or tantalum oxide.

5. The process of claim 3 wherein the electrolyte solution is a phosphoric acid solution.

6. The process according to claim 1 wherein the temperature of the electrolyte solution is about 0 to about 100° C.

7. The process according to claim 1 wherein the voltage is applied as a sine wave, a square wave, a triangular wave, a rectangular wave, or a parabolic wave.

8. The process according to claim 1 wherein the high voltage and low voltage is applied as a cycle of about 0.01 second to about 10 seconds.

9. The process according to claim 1 wherein the duration of the cycles is about 1 minute to about 60 minutes.

10. The process according to claim 1 wherein the high voltage is between about 15 volts and 30 volts.

11. The process according to claim 10 wherein the capacitor is impregnated with poly(3,4-ethylenedioxythiophene).

12. The process according to claim 1 wherein the capacitor is impregnated with polypyrrole, polyaniline, polythiophene, and their derivatives.

13. The process according to claim 1 wherein the conductive polymer impregnated capacitor is formed by an electrochemical or chemical oxidative process.

14. The process according to claim 1 wherein the capacitor is formed from a valve metal or valve metal oxide.

15. The process according to claim 14 wherein the capacitor is formed from a tantalum or tantalum oxide.

* * * * *

UNITED STATES PATENT AND TRADEMARK OFFICE
CERTIFICATE OF CORRECTION

PATENT NO.    : 6,334,945 B1
DATED         : January 1, 2002
INVENTOR(S)   : Philip Michael Lessner et al.

It is certified that error appears in the above-identified patent and that said Letters Patent is hereby corrected as shown below:

<u>Column 7,</u>
Line 5, "claim 10" has been replaced with -- claim 12 --.

Signed and Sealed this

Twentieth Day of May, 2003

JAMES E. ROGAN
*Director of the United States Patent and Trademark Office*